United States Patent
Park et al.

(10) Patent No.: US 9,020,231 B2
(45) Date of Patent: Apr. 28, 2015

(54) METHOD AND APPARATUS FOR MEASURING CAPTURED OBJECT USING BRIGHTNESS INFORMATION AND MAGNIFIED IMAGE OF CAPTURED IMAGE

(75) Inventors: Sung-wook Park, Gangwon-do (KR); Jin-yong Lee, Gangwon-do (KR)

(73) Assignee: Samsung Medison Co., Ltd., Gangwon-Do (JP)

( * ) Notice: Subject to any disclaimer, the term of this patent is extended or adjusted under 35 U.S.C. 154(b) by 195 days.

(21) Appl. No.: 13/548,886

(22) Filed: Jul. 13, 2012

(65) Prior Publication Data

US 2013/0177226 A1    Jul. 11, 2013

(30) Foreign Application Priority Data

Jan. 9, 2012    (KR) .................. 10-2012-0002468

(51) Int. Cl.
*G06K 9/00*    (2006.01)
*G06T 7/00*    (2006.01)

(52) U.S. Cl.
CPC ..... *G06T 7/0081* (2013.01); *G06T 2207/20148* (2013.01)

(58) Field of Classification Search
None
See application file for complete search history.

(56) References Cited

U.S. PATENT DOCUMENTS

| | | | |
|---|---|---|---|
| 6,979,294 B1 | 12/2005 | Selzer et al. | |
| 2003/0174890 A1 | 9/2003 | Yamauchi | |
| 2004/0042791 A1* | 3/2004 | Suekane et al. | 396/661 |
| 2006/0116578 A1* | 6/2006 | Grunwald et al. | 600/440 |
| 2010/0249580 A1* | 9/2010 | Goto et al. | 600/425 |
| 2010/0312112 A1* | 12/2010 | Kamiyama | 600/443 |
| 2011/0164796 A1* | 7/2011 | Hundley et al. | 382/128 |
| 2012/0209115 A1* | 8/2012 | Tonomura | 600/438 |

FOREIGN PATENT DOCUMENTS

| | | |
|---|---|---|
| JP | 2008-161220 A | 7/2008 |
| KR | 10-2003-0074414 A | 9/2003 |
| KR | 10-2007-0014099 A | 1/2007 |
| KR | 10-2009-0106107 A | 10/2009 |
| KR | 10-2011-0083153 A | 7/2011 |

OTHER PUBLICATIONS

Office Action Korean Patent Application No. 10-2012-0002468 dated Jun. 27, 2014 with full English translation.
Korean Notice of Allowance issued in counterpart Korean Patent Application No. 10-2012-0002468 on Dec. 17, 2014; 4 pages including English translation.

* cited by examiner

*Primary Examiner* — Amara Abdi
(74) *Attorney, Agent, or Firm* — McDermott Will & Emery LLP

(57) ABSTRACT

Method and apparatus for measuring an object in a captured image. The method includes: receiving a captured image from a photographing apparatus; selecting a predetermined region on the received image based on a user input; magnifying an image with respect to the selected, predetermined region; obtaining brightness information of the received image; displaying at least one of the magnified image and the obtained brightness information; and selecting the object on the magnified image based on the obtained brightness information. The method may further include: obtaining pixel information of the received image; and measuring the selected object based on the pixel information.

13 Claims, 4 Drawing Sheets

METHOD AND APPARATUS FOR MEASURING CAPTURED OBJECT USING BRIGHTNESS INFORMATION AND MAGNIFIED IMAGE OF CAPTURED IMAGE

CROSS-REFERENCE TO RELATED PATENT APPLICATION

This application claims the benefit of Korean Patent Application No. 10-2012-0002468, filed on Jan. 9, 2012, in the Korean Intellectual Property Office, the disclosure of which is incorporated herein in its entirety by reference.

BACKGROUND OF THE INVENTION

1. Field of the Invention

The present invention relates to a method and apparatus for measuring an object in a captured image, and more particularly, to a method and apparatus for measuring a captured object by using a magnified image of the captured image and brightness information of the captured image.

2. Description of the Related Art

An ultrasonic diagnostic system is used to transfer an ultrasonic signal from the surface of a body of an object toward a predetermined portion in the body and to obtain an image of a cross-section of a soft tissue or hematocele by using information of an ultrasonic signal reflected by a tissue in the body.

The ultrasonic diagnostic system is compact and low cost and is capable of displaying data in real-time. In addition, the ultrasonic diagnostic system is highly stable since exposure of, for example, X-rays does not occur. Thus, the ultrasonic diagnostic system is widely used with other imaging diagnostic systems such as an X-ray diagnostic system, a computerized tomography (CT) scanner, or a magnetic resonance imaging (MRI) system.

For example, in order to accurately detect a size of an object, points on the object to be measured are to be accurately determined. That is, a size of the object may be measured by selecting points of the object for measurement, and in this case, in order to measure an exact size of the object, the various points are to be determined exactly.

SUMMARY OF THE INVENTION

The present invention provides a method and apparatus for measuring a captured object by using a magnified image of the captured image and brightness information of the captured image.

According to an aspect of the present invention, there is provided a method of measuring an object in a captured image, the method including: receiving a captured image from a photographing apparatus; selecting a predetermined region on the received image based on a user input; magnifying an image with respect to the selected predetermined region; obtaining brightness information of the received image; displaying at least one of the magnified image and the obtained brightness information; and selecting the object on the magnified image based on the obtained brightness information. Also, the method may comprise obtaining pixel information of the received image; and measuring the selected object based on the pixel information.

According to another aspect of the present invention, there is provided an apparatus for measuring an object in a captured image, the apparatus including: an image receiving unit for receiving an image that is captured using a photographing apparatus; an image selecting unit for selecting a predetermined region from the received image based on a user input; an image magnifying unit for magnifying an image with respect to the selected predetermined region; a brightness information obtaining unit for obtaining brightness information with respect to the received image; a display unit for displaying at least one of the magnified image and the obtained brightness information; and an object selecting unit for selecting an object on the magnified image based on the obtained brightness information. Also, the apparatus may comprise a pixel information obtaining unit for obtaining pixel information with respect to the received image; and a measuring unit for measuring an object selected based on the pixel information.

According to another aspect of the present invention, there is provided a computer readable recording medium having recorded thereon a program for executing the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Expressions such as "at least one of," when preceding a list of elements, modify the entire list of elements and do not modify the individual elements of the list.

Hereinafter, the terms used in the specification will be briefly described, and then the present invention will be described in detail.

The terms used in this specification are those general terms currently widely used in the art in consideration of functions in regard to the present invention, but the terms may vary according to the intention of those of ordinary skill in the art, precedents, or new technology in the art. Also, specified terms may be selected by the applicant, and in this case, the detailed meaning thereof will be described in the detailed description of the invention. Thus, the terms used in the specification should be understood not as simple names but based on the meaning of the terms and the overall description of the invention.

Throughout the specification, it will also be understood that when a component "includes" an element, unless there is another opposite description thereto, it should be understood that the component does not exclude another element but may further include another element. In addition, terms such as ". . . unit", ". . . module", or the like refer to units that perform at least one function or operation, and the units may be implemented as hardware or software or as a combination of hardware and software.

Throughout the specification, an "ultrasonic image" refers to an image of an object obtained using an ultrasonic wave. The object may refer to a portion of a body. For example, the object may be an organ such as a liver, heart, uterus, brain, breast, or stomach, or may be an embryo.

Throughout the specification, a "user" may refer to a medical specialist such as a doctor, nursing staff, a clinical pathologist, or a medical imaging specialist, but is not limited thereto.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Like numbers refer to like elements throughout.

Figure 1:
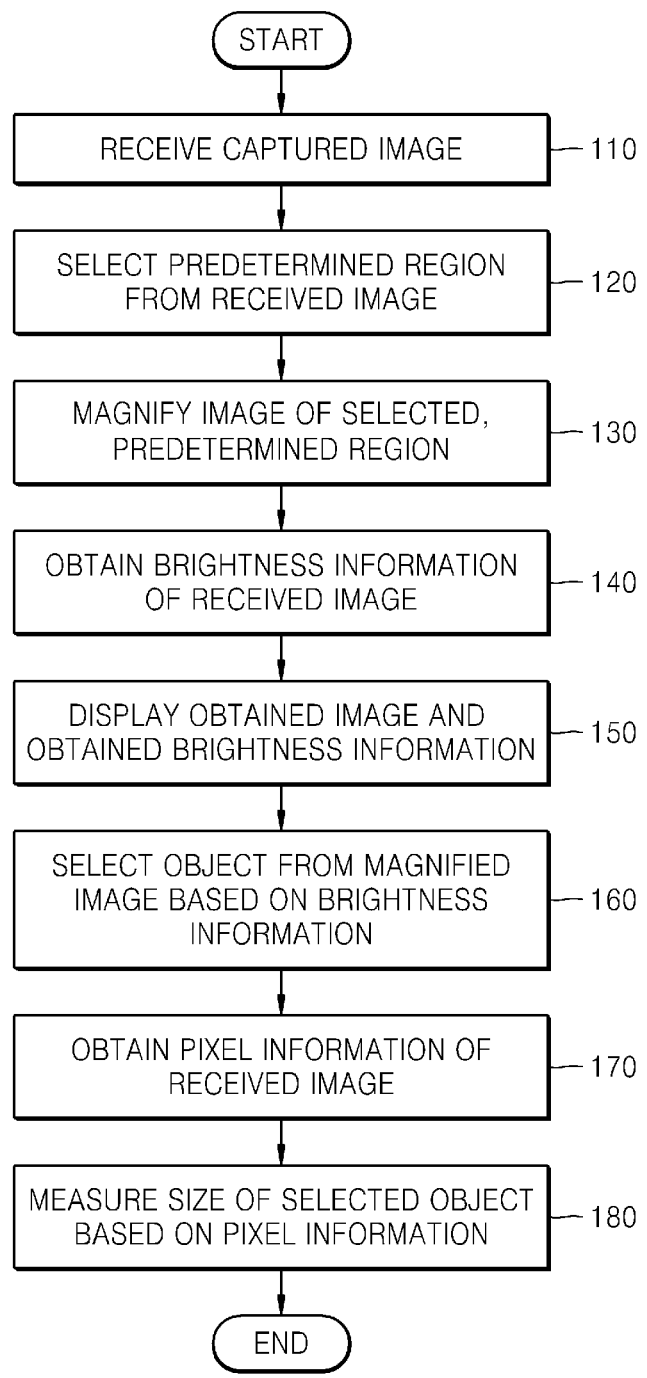
FIG. 1 is a flowchart illustrating a method of measuring an object from a captured image, according to an embodiment of the present invention.

FIG. 1 is a flowchart illustrating a method of measuring an object from a captured image, according to an embodiment of the present invention.

Figure 2A:
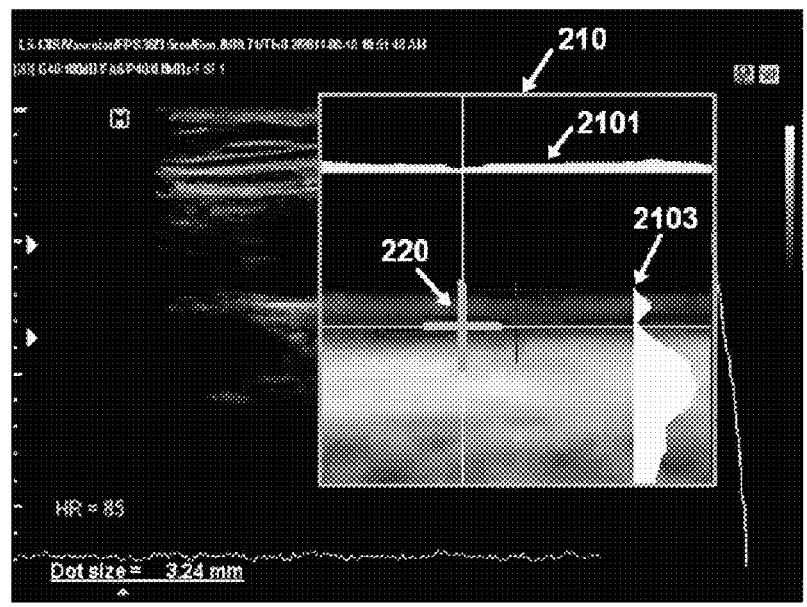
FIG. 2A is an ultrasonic image of a captured object that is measured using a magnified image of the captured image and brightness information of the captured image, according to an embodiment of the present invention.
Figure 2B:
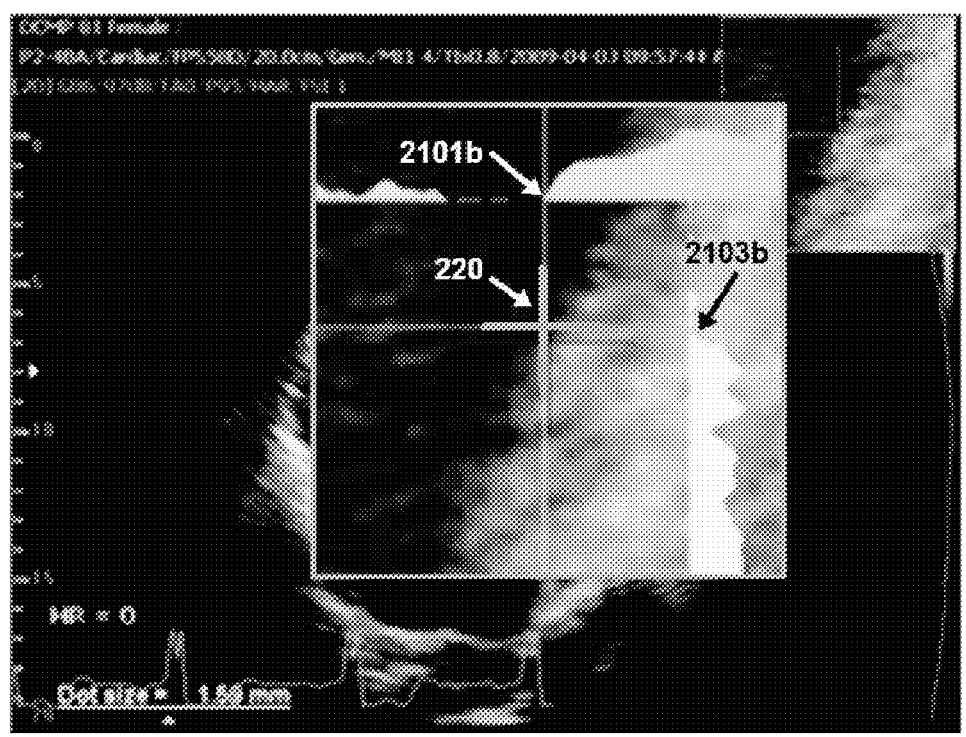
FIG. 2B is an ultrasonic image of a captured object that is measured using a magnified image of the captured image and brightness information of the captured image, according to another embodiment of the present invention.

FIG. 2A is an ultrasonic image of a captured object that is measured using a magnified image of the captured image and brightness information of the captured image, according to an embodiment of the present invention. FIG. 2B is an ultrasonic image of a captured object that is measured using a magnified image of the captured image and brightness information of the captured image, according to another embodiment of the present invention.

According to embodiments of the present invention, when an object is measured, for example, length, size, surface area, volume, motion time, or inclination of the object may be measured.

Also, when an object is measured according to embodiments of the present invention, for example, motion speed of an object in a color mode of a photographing apparatus using an ultrasonic wave may be measured.

According to an aspect of the present invention, there is provided a method of measuring an object from a captured image. The method may include: receiving an image captured using a photographing apparatus (operation 110); selecting a predetermined region on the received image based on a user input (operation 120); magnifying the selected predetermined region (operation 130); obtaining brightness information of the received image (operation 140); displaying at least one of the magnified image and the obtained brightness information (operation 150); and selecting an object from the magnified image based on the obtained brightness information (operation 160). In addition, the method may further include: obtaining pixel information of the received image (operation 170); and measuring the selected object based on the pixel information (operation 180).

In operation 110 of receiving an image captured using a photographing apparatus, a captured image may be received from the photographing apparatus via wired or wireless communication.

In operation 120, a predetermined region of the received image may be selected based on a user input by moving scale marks 310 and 320 that are provided in advance. Alternatively, a predetermined region of a captured image may be selected by moving a cursor 330 that is provided in advance on the received image to generate a signal for selecting a predetermined region. For example, when selecting a predetermined region by moving the cursor 330 and generating a signal for selecting a predetermined region, a boundary with respect to the predetermined region may be generated according to movement of the cursor 330. For example, the boundary with respect to the predetermined region may be represented by a circle or a polygon such as a square or the like.

In operation 130, a magnified image 210 may be obtained by magnifying a selected predetermined region of an image at a predetermined scale. The predetermined scale may be set in advance or may be a variable scale.

The brightness information obtained with respect to the received image in operation 140 may include brightness histograms 2101 and 2103 representing brightness distribution along a plurality of axes on the captured image. The plurality of axes on the captured image according to an embodiment of the present invention may be perpendicular to one another. For example, the plurality of axes on the captured image may include a horizontal axis in a horizontal direction of a captured image of an object and a vertical axis in a vertical direction of a captured image of an object.

In operation 150 of displaying at least one of the magnified image and the obtained brightness information, the obtained brightness information may also be displayed on the magnified image. In addition, in operation 150 of displaying at least one of the magnified image and the obtained brightness information, as a cursor 220 of the magnified image 210 moves, the brightness histograms 2101 and 2103 regarding a plurality of axes including the cursor 220 may be displayed.

In operation 160 of selecting an object from an image based on the obtained brightness information, at least one point for measuring an object may be selected by moving the cursor 220 based on brightness information with respect to the plurality of axes including the cursor 220. According to another embodiment of the present invention, operation 160 of selecting an object from the image based on the obtained brightness information may include selecting at least one point where a variation rate of brightness information obtained from the image 210 is equal to or greater than a preset value. The at least one point where the variation rate of brightness information is equal to or greater than the preset value may preferably include a boundary of an object. For example, a rapid variation in brightness may occur in a boundary between a captured object and a photographing background on the brightness histograms 2101 and 2103, and thus the variation rate of brightness information may have the greatest value (see 2101*b* and 2103*b*).

In operation 170 of obtaining pixel information with respect to a received image, each pixel size may be obtained based on the scale marks 310 and 320 included on the received image and the number of pixels included in the selected predetermined region of the received image. The selected predetermined region of the received image may include a predetermined region selected based on a user input in operation 120. For example, pixel information may be obtained using the scale marks 310 and 320 included on the received image and a size of a predetermined region selected based on a user input. By dividing the size of the selected predetermined region by the number of pixels included in the selected predetermined region, each pixel size unit may be obtained.

In operation 180 of measuring a selected object based on the pixel information according to an embodiment of the present invention, a size of a selected object may be measured based on the obtained pixel size. For example, in operation 160, the number of pixels existing within at least one point selected with respect to an object may be obtained, and a size of an object which is to be measured may be measured based on the obtained number of pixels and each pixel size.

Figure 3A:
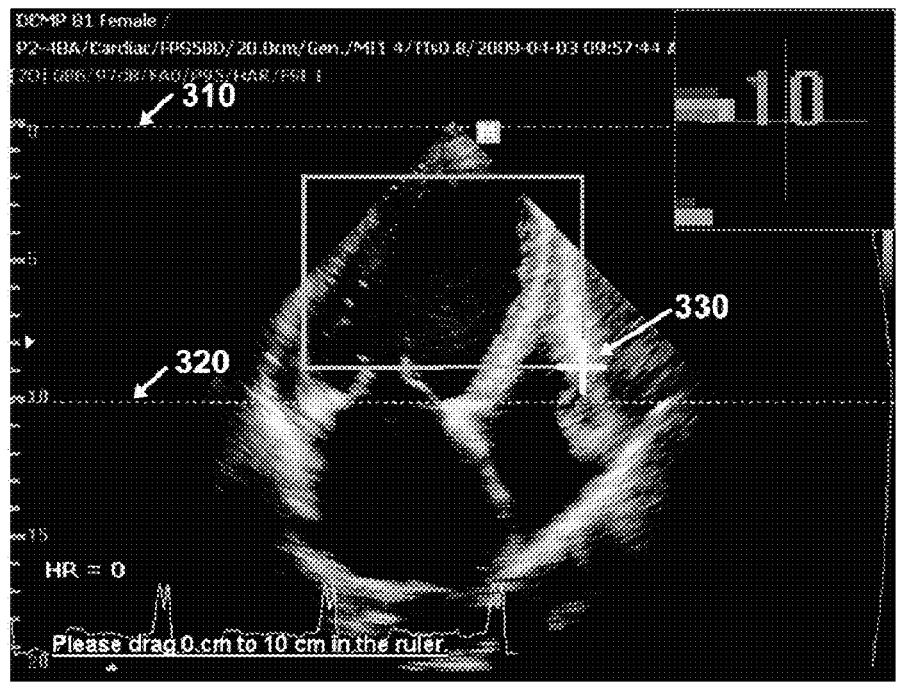
FIG. 3A is an ultrasonic image in regard to which pixel information is obtained using scale marks included on the ultrasonic image, according to an embodiment of the present invention.

FIG. 3A illustrates an ultrasonic image in regard to which pixel information is obtained using the scale marks 310 and 320 included on an image, according to an embodiment of the present invention.

As described above, pixel information according to an embodiment of the present invention may be obtained using the scale marks 310 and 320 included in the received image and the number of pixels included in the selected predetermined region of the received image. The predetermined region may be selected by moving the scale marks 310 and 320 that are provided in advance on the received image or by generating a boundary with respect to the predetermined region according to movement of a cursor 300 by moving the cursor 330 that is provided in advance on the received image. The boundary with respect to the predetermined region may be represented by a circle or a polygon such as a square. Pixel information may be obtained by using a size of the selected predetermined region and the number of pixels included in the selected predetermined region.

Figure 3B:
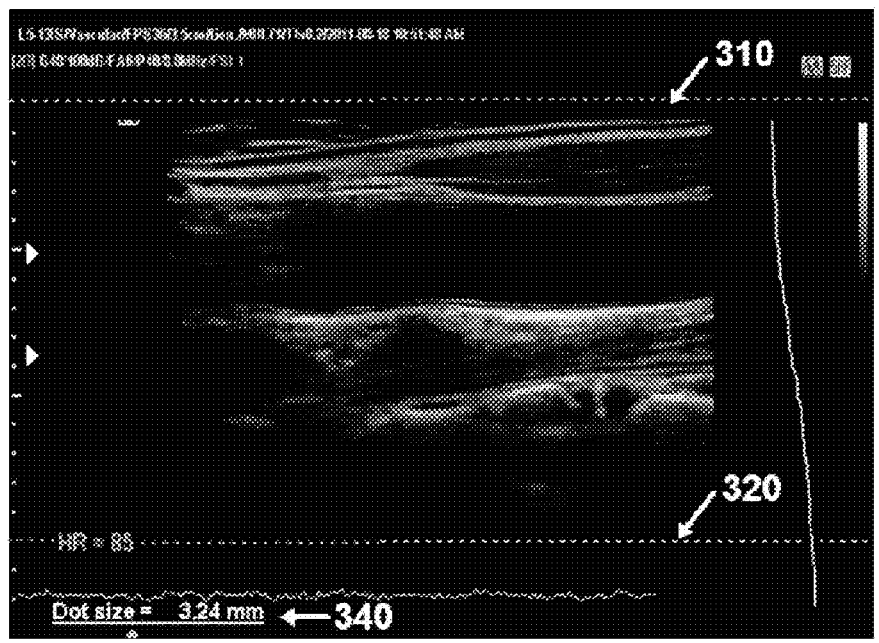
FIG. 3B is an ultrasonic image in regard to which each pixel size is obtained based on the scale marks included on the ultrasonic image and the number of pixels included in a predetermined portion of the ultrasonic image, according to another embodiment of the present invention.

FIG. 3B illustrates an ultrasonic image in regard to which each pixel size is obtained based on the scale marks 310 and 320 included on the image and the number of pixels included in a predetermined portion of the image, according to another embodiment of the present invention.

According to the present embodiment, a predetermined region is selected by moving the scale marks 310 and 320 that are provided in advance on the received image, and a size of each pixel unit may be obtained by using a size of a selected predetermined region and the number of pixels included in the selected predetermined region. Also, each pixel size may be obtained based on a predetermined region that has a boundary generated according to movement of a cursor 330 provided in advance on the received image and by using the number of pixels included in the region.

Figure 4:
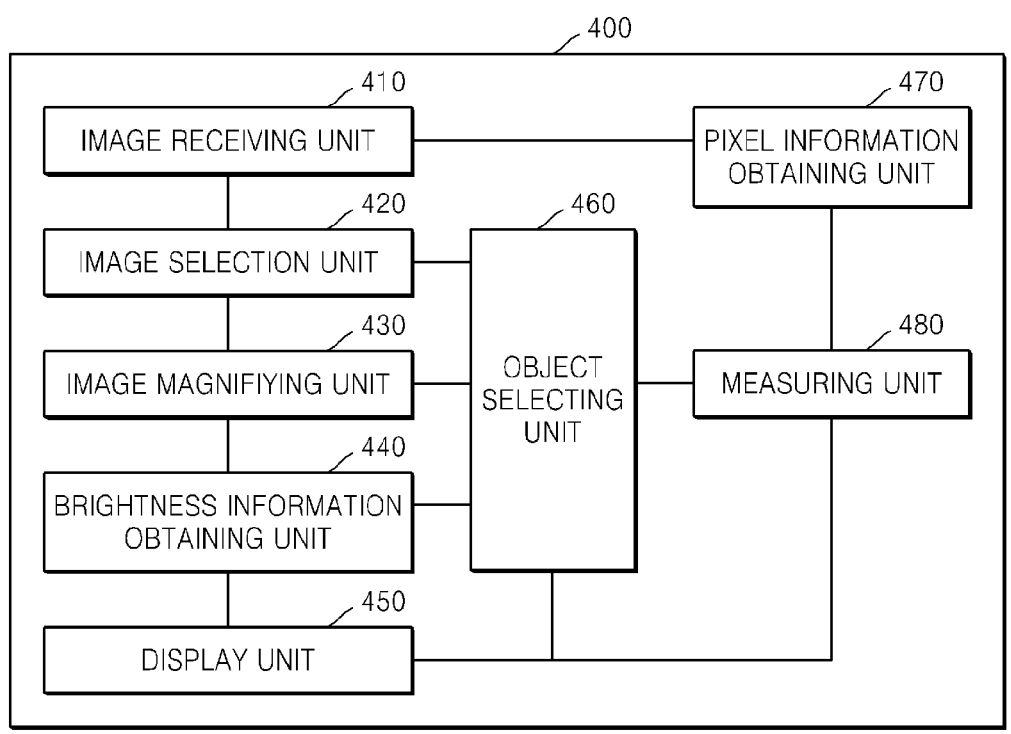
FIG. 4 illustrates an apparatus for measuring an object from a captured image, according to an embodiment of the present invention.

FIG. 4 illustrates an apparatus 400 for measuring an object from a captured image, according to an embodiment of the present invention.

According to another embodiment, an apparatus 400 for measuring an object from a captured image is provided. The apparatus may include an image receiving unit 410 for receiving an image that is captured using a photographing apparatus, an image selecting unit 420 for selecting a predetermined region from a received image based on a user input, an image magnifying unit 430 for magnifying an image with respect to the selected predetermined image, a brightness information obtaining unit 440 for obtaining brightness information with respect to the received image, a display unit 450 for displaying at least one of the magnified image and the obtained brightness information, and an object selecting unit 160 for selecting an object from the magnified image based on the obtained brightness information. In addition, the apparatus 400 may further include a pixel information obtaining unit 470 for obtaining pixel information with respect to the received image and a measuring unit 480 for measuring the selected object based on pixel information.

The image receiving unit 410 may receive a captured image from a photographing apparatus via wired or wireless communication.

The image selecting unit 420 may select a predetermined region by moving scale marks 310 and 320 that are provided in advance according to a user input with respect to the received image. Also, according to another embodiment of the present invention, the predetermined region may be selected by moving the cursor 330 provided on the received image in advance and generating a signal for selecting a predetermined region. For example, when moving the cursor 330 and generating a signal for selecting a predetermined region, a boundary with respect to the predetermined region may be generated according to movement of the cursor 330. For example, the boundary with respect to the predetermined region may be represented by a circle or a polygon such as a square.

The image magnifying unit 430 may magnify an image with respect to a predetermined region selected at a predetermined scale. The predetermined scale may be a preset scale or a variable scale.

The brightness information obtained by the brightness information obtaining unit 440 may include brightness histograms 2101 and 2103 that represent a brightness distribution according to a plurality of axes on a captured image. The plurality of axes on a captured image according to an embodiment of the present invention may include a horizontal axis in a horizontal direction of a captured image containing an object and a vertical axis in a vertical direction of the captured image containing the object.

The display unit 450 may display the magnified image 210 and the obtained brightness information at the same time. Also, the display unit 450 may display the brightness histograms 2101 and 2103 with respect to a plurality of axes including a cursor 220 that moves on the magnified image 210.

The object selecting unit 460 may select at least one point for measuring an object while moving the cursor 220 based on brightness information with respect to the plurality of axes including the cursor 220. Alternatively, the object selecting unit 460 may select at least one point where a variation rate of brightness information obtained from the magnified image 210 is equal to or greater than a preset value. The at least one point where the variation rate of brightness information is equal to or greater than a preset value may preferably include a boundary of an object. For example, a rapid variation in brightness may occur in a boundary between a captured object and a photographing background on the brightness histograms 2101 and 2103, and thus the variation rate of brightness information may have the greatest value (see 2101b and 2103b).

The pixel information obtaining unit 470 may obtain each pixel size based on the scale marks 310 and 320 included in the received image and the number of pixels included in a selected, predetermined region of the received image. The selected predetermined region of the received image may include a predetermined region selected based on a user input by using the image selecting unit 420. For example, pixel information includes scale marks included in the received image and a size of a predetermined region selected based on a user input. Each pixel size unit may be obtained by dividing a size of an obtained predetermined region by the number of pixels included in the selected predetermined region.

The measuring unit 480 may measure a selected object based on each obtained pixel size. For example, the object selecting unit 460 may obtain the number of pixels existing around at least one point that is selected with respect to an object, and measure the object to be measured, based on the obtained number of pixels and the pixel size.

According to the embodiments of the present invention, a length, surface area, volume, motion time, motion velocity, or inclination of an object may be measured in the above-described manner.

The embodiments of the present invention can be written as computer programs and can be implemented in general-use digital computers that execute the programs using a computer readable recording medium.

Examples of the computer readable recording medium include read-only memory (ROM), random-access memory (RAM), CD-ROMs, magnetic tapes, floppy disks, optical data storage devices, etc.

While the present invention has been particularly shown and described with reference to exemplary embodiments thereof, it will be understood by those of ordinary skill in the art that various changes in form and details may be made therein without departing from the spirit and scope of the present invention as defined by the following claims. The embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of measuring an object in a captured image, the method comprising:
    receiving a captured image from a photographing apparatus;
    selecting a predetermined region on the received image based on a user input;
    magnifying an image with respect to the selected predetermined region;
    obtaining brightness information of the received image;
    displaying at least one of the magnified image and the obtained brightness information; and
    selecting the object on the magnified image based on the obtained brightness information,
    wherein the brightness information includes brightness histograms representing a brightness distribution according to a plurality of axes on the captured image, and
    wherein in the displaying of the at least one of the magnified image and the obtained brightness information, as a cursor on the magnified image moves, brightness histograms with respect to a plurality of axes including the cursor are displayed.

2. The method of claim 1, wherein the plurality of axes on the captured image are perpendicular to one another.

3. The method of claim 1, wherein in the selecting of the object at least one point whose variation of the obtained brightness information on the magnified image is equal to or greater than a preset value is selected.

4. A non-transitory computer readable recording medium having embodied thereon a program for executing the method of claim 1.

5. The method of claim 1, further comprising:
    obtaining pixel information of the received image; and
    measuring the selected objected based on the pixel information.

6. The method of claim 5, wherein in the obtaining pixel information of the received image, each pixel size is obtained based on scale marks included on the received image and the number of pixels included in the selected predetermined region of the received image.

7. The method of claim 6, wherein the measuring of the selected object comprises measuring the selected object based on the obtained pixel size.

8. An apparatus for measuring an object in a captured image, the apparatus comprising:
    an image receiving unit for receiving an image that is captured using a photographing apparatus;
    an image selecting unit for selecting a predetermined region from the received image based on a user input;
    an image magnifying unit for magnifying an image with respect to the selected predetermined region;
    a brightness information obtaining unit for obtaining brightness information with respect to the received image;
    a display unit for displaying at least one of the magnified image and the obtained brightness information;
    an object selecting unit for selecting an object on the magnified image based on the obtained brightness information,
    wherein the brightness information comprises brightness histograms representing a brightness distribution according to a plurality of axes on the captured image, and
    wherein as a cursor on the magnified image moves, the display unit displays brightness histograms with respect to the plurality of axes including the cursor.

9. The apparatus of claim 8, wherein the plurality of axes on the captured image are perpendicular to one another.

10. The apparatus of claim 8, wherein the object selecting unit selects at least one point where a variation rate of the obtained brightness information is equal to or greater than a preset value.

11. The apparatus of claim 8, further comprising:
    a pixel information obtaining unit for obtaining pixel information with respect to the received image; and
    a measuring unit for measuring an object selected based on the pixel information.

12. The apparatus of claim 11, wherein the pixel information obtaining unit obtains each pixel size based on scale marks included in the received image and the number of pixels included in the selected predetermined region of the received image.

13. The apparatus of claim 12, wherein the measuring unit measures the selected object based on each obtained pixel size.

* * * * *